3,740,316
HYDROLYSIS OF STEROIDAL 21-CARBONATES

Hershel L. Herzog, Glen Ridge, Lois Weber, Springfield, and Elliot L. Shapiro, Cedar Grove, N.J., assignors to Schering Corporation, Bloomfield, N.J.
No Drawing. Filed Jan. 27, 1971, Ser. No. 110,340
Int. Cl. C07c *167/00*
U.S. Cl. 195—51 R                   12 Claims

ABSTRACT OF THE DISCLOSURE

This invention relates to a process for the enzymatic hydrolysis of a C–21 carbalkoxy steroid of the pregnane series by pancreatin, and provides a means for preparing 21-hydroxy-17α-acyloxy corticosteroids from 21-carbalkoxy-17α-acyloxy corticosteroids.

---

This invention relates to the enzymatic hydrolysis of steroidal 21-carbalkoxylates. More particularly, this invention relates to the hydrolytic removal of such a function from a 21-carbalkoxy steroid of the substituted pregnane series.

The instant invention may be described as residing in a process for hydrolyzing a 21-carbalkoxy steroid of the substituted pregnane series by subjecting such a compound to the hydrolytic action of pancreatin in a liquid medium comprising water and a water miscible organic solvent and removing the corresponding 21-hydroxy compound from said medium.

The instant invention may also be described as residing in a process for selectively hydrolyzing a 21-carbalkoxy-17-acyloxy corticosteroid by subjecting said corticosteroid to the hydrolytic action of pancreatin in a liquid medium comprising water and a water miscible organic solvent and isolating the corresponding 21-hydroxy compound from said medium.

This invention is based upon our discovery that pancreatin effects the above-described hydrolysis at C–21 without the concomitant removal of ester groups from other positions on the corticosteroid molecule.

It is known in the art that the esters of many 21-hydroxy compounds of the substituted pregnane series, or the 21-hydroxy compounds derived therefrom, are labile under the conditions used for conventional hydrolysis.

It is also known that, when such compounds are subjected to conventional hydrolytic techniques, they undergo non-selective ester removal, D-homo-rearrangement, side chain degradation, and the like. By the process of this invention, the foregoing disadvantages are obviated or are substantially reduced making the process ideally suited for the hydrolysis of labile 21-carbalkoxy steroids.

The instant process may advantageously be used to prepare 17α-monoesters of the corticosteroids, some of which have been found to exert a potent topical anti-inflammatory action. For example, in U.S. Pat. 3,312,590 certain 17α-monoesters and 17α,21-diesters are described as providing a considerably enhanced anti-inflammatory action on topical application. The 17α-valerate of betamethasone, for example, is such a compound and it may be prepared by employing this process on the appropriate 21-carbalkoxy-17α-valeryloxy starting material.

Similarly, the 17α-benzoate of betamethasone may also be prepared by employing the process of this invention. This compound is also described as providing enhanced anti-inflammatory action on topical application.

The starting 21-carbalkoxy steroids of the substituted pregnane series used herein are generally well known in the art, and may be prepared, for example, by the treatment of a 21-hydroxy corticosteroid with an alkylhalogeno carbonate, e.g. ethyl chlorocarbonate, in a substantially anhydrous tertiary organic vase, e.g. pyridine, or in other suitable substantially anhydrous solvents, whereby the C–21 carbalkoxy compound is produced.

In those instances wherein the desired compound has other esterifiable hydroxyl groups (e.g. at C–11) the hydroxyl group or groups may be protected by an easily removable function subsequent to the preparation of the 21-carbalkoxy group. In the case of corticosteroids, the C–17 hydroxy function may then be esterified by methods known in the art and the protective groups removed. Of course, other routes to the starting compounds are known in the art and may be employed where convenient.

As used herein, the term "substituted pregnane series" embraces those steroids that have the conventional steroidal skeleton and a 2-carbon side chain. This term embraces both the 18 and 19 nor-steroids but requires the existence of at least one hydroxyl function (i.e. at C–21). Further, the term also embraces those compounds wherein the steroidal skeleton is unsaturated in any one or more of rings A, B, C and D. Such compounds as those having $\Delta^1$, $\Delta^4$, $\Delta^6$, $\Delta^{(9,11)}$, $\Delta^{(14,16)}$, $\Delta^{16}$ and combinations of the foregoing are included within the term, "substituted pregnane series." When the term is used in conjunction with the term "corticosteroid" or "corticoid," there is also a requirement that a C–17 hydroxyl function be present. There may be substituents on the steroidal skeleton, such as, but not limited to, oxygen (forming carbonyl and hydroxyl groups) halogens, alkyl and nitrogen containing functions such as oximes, or the like.

The process of this invention may be effected by subjecting a 21-carbalkoxy steroid to the hydrolytic action of pancreatin said hydrolysis taking place in a liquid medium for from about 1 to about 4 days. The enzyme preparation is used in the instant process at from about 10 to about 100 grams per gram of steroid; it being generally preferred to employ the substance at about 50 grams per gram of steroid. The process is advantageously carried out at a pH of about 6 to about 8, at a temperature of from about 5° to about 50° C. and is preferably conducted at a pH of about 7 and a temperature of about 25° C. The liquid medium used herein generally consists of water and a water miscible organic solvent including such solvents as dioxane, tetrahydrofuran, acetone, dimethylformamide and preferably the lower alcohols, especially those having from 1 to 4 carbon atoms. The ratio of the organic solvent to the reactants is not especially critical provided the organic solvent is present in sufficient quantity to effect solution of the steroid.

Upon completion of the hydrolysis, the product is usually obtained by extraction with a water-immiscible solvent. The choice of extraction solvent is determined in most instances by the solubility of the steroid product. In general, it is advantageous to use such solvents as chloroform, ethyl acetate, toluene, diethyl ether, dibutyl ether, ethylene dichloride and the like. In those instances wherein emulsions are encountered during the extraction, "salting" of the aqueous layer usually helps separate the solvent layers.

The hydrolytic agent of the instant invention, pancreatin, may be described generically as an enzyme preparation obtained from bovine or porcine pancreas. It is a well known commercially available product and is defined both as an enzyme and as a product containing a mixture of enzymes, such as, amylopsin, trypsin, and steapsin. It is further defined by the National Formulary and the U.S. Pharmacopeia in terms of its ability to hydrolyze a specific quantity (25 gms./gm.) of starch to soluble carbohydrates. Pancreatin is described as a cream-colored amorphous powder of faint odor and meat-like taste, which is slowly and partly soluble in water, but insoluble in alcohol.

The process of the instant invention is usually monitored by a suitable physical measurement. In general such a measurement may be affected by a variety of techniques. Applicants prefer the simple expedient of thin layer chromatography on an extract of the reaction mixture and a comparison of the $R_f$ of the sample with that of the starting material. This can usually be accomplished with the aid of an ultraviolet light or, if the steroid does not possess an ultraviolet absorbing chromophore, by the use of a suitable spray, such as a mixture of methanol and concentrated sulfuric acid. The plate is heated until the steroid appears as a dark spot against a white to off-white background. Alternatively, in those instances wherein the starting material possesses both a C–17 and a C–21 ester function, the completeness of the hydrolysis may be determined by saponifying a sample of the starting material to remove both ester functions and by comparing the $R_f$ of the extracted sample with the diester starting material and the diol saponification product. By quantitative thick layer techniques, a determination of the starting material, the product and any by-products formed may be made.

In addition to the foregoing, infrared spectroscopy may be utilized to follow the course of the reaction and to establish the identity of the product.

The following examples are set forth to illustrate the instant invention and are not to be construed as limiting the scope of the instant invention.

EXAMPLE 1

9α-fluoro-16β-methyl-11β,17α,21-triol - 1,4 - pregnadiene-3,20-dione 17-valerate (betamethasone 17-valerate)

Dissolve 500 mg. of 9α-fluoro-16β-methyl-1,4-pregnadiene-11β,17α,21 - triol-3,20-dione 17-valerate-21-carbethoxylate in 500 ml. of ethanol. Suspend 25 g. pancreatin N.F. in 1250 ml. of distilled water and add the sterol solution to this suspension with stirring. Adjust the temperature of the mixture to 23° C., the pH to 6 and stir until the hydrolysis is complete while maintaining the temperature essentially constant.

When the hydrolysis is complete extract the reaction mixture with ethyl acetate and wash the extracts with water. Dry the extracts over magnesium sulfate and evaporate to dryness in vacuo.

Dissolve the residue in 5.0 ml. of chloroform and add the solution to previously prepared chromatographic column containing 50 g. of silica gel. Elute the column with hexane containing increasing increments of acetone. Fractions eluted with 18% acetone/82% hexane through those eluted with 24% acetone/76% hexane are pooled and concentrated to a residue yielding the title product. Alternatively, the residue from the ethyl acetate extract is crystallized repeatedly from acetone/i-propyl ether yielding thereby purified betamethasone 17-valerate.

EXAMPLE 2

9α,11β-dichloro-17α,21-dihydroxy - 16α - methyl-1,4-pregnadiene-3,20-dione 17-butyrate Dissolve 50 mg. of 9α,11β-dichloro-17α,21-dihydroxy-16α-methyl-1,4 - pregnadiene-3,20-dione 17-butyrate-21-carbethoxylate in 25 ml. of methanol. Prepare a suspension of 2.5 gms. of pancreatin in 125 ml. of distilled water. Add the sterol solution to the enzyme suspension with stirring and adjust the temperature of the mixture to 25° C. and the pH to 6.0. Stir the reaction at about 25° C. until the reaction is complete as determined by thin layer chromatography.

Extract the reaction mixture with ethyl acetate and wash the extracts with water. Dry the ethyl acetate solutions over magnesium sulfate. Evaporate the ethyl acetate solution in vacuo to a residue and redissolve in 2.0 ml. of chloroform. Prepare a series of thick layer plates by coating 8" x 8" glass plate with about a 0.2 mm. layer of silica gel. Streak 0.4 ml. of the chloroform solution across each of five plates and develop the plates in tanks containing chloroform: ethyl acetate 9:1. The title product which may be detected by irradiation with ultraviolet light has an $R_f$ of 0.2 to 0.4. The silica gel from this area of the plate is scraped into a suitable sized vessel and extracted with chloroform:ethyl acetate 1:1. Concentration of the extracts yields 9α,11β-dichloro-17α, 21-dihydroxy-16α-methyl-1,4 - pregnadiene-3,20-dione-17-butyrate.

EXAMPLE 3

17α,21-dihydroxy-1,4-pregnadiene-3,11,20-trione 17-propionate

Dissolve 5.0 gms. of 17α,21-dihydroxy-1,4-pregnadiene-3,11,20-trione 17-propionate, 21-carbethoxylate in 2500 ml. of methanol. Prepare a suspension of 250 gms. of pancreatin N.F. in 12.5 liters of distilled water. Add the sterol solution to the enzyme suspension with stirring and adjust the temperature of the mixture to between 20° to 25° C. and the pH to 6.0. Stir the reaction mixture at the designated temperature range until the reaction is complete as determined by thin layer chromatography of a sample. Extract the reaction mixture repeatedly with ethyl acetate; wash the extracts with water, and dry the ethyl acetate solution over magnesium sulfate. Evaporate the ethyl acetate solution to a residue in vacuo and redissolve the residue in a minimum volume of chloroform. Prepare a chromatographic column using 500 g. of silica gel suspended in hexane and add the sterol solution to the same. Elute the column with hexane taking 250 ml. fractions followed by increasing increments of acetone in hexane until the steroid products have been removed. Evaporate the fractions to residues and combine fractions having similar thin layer mobility as determined by their $R_f$ values. By crystallizing the thus combined fractions from acetone-hexane 17α,21-dihydroxy-1,4-pregnadiene-3,11,20-trione 17-propionate is obtained.

EXAMPLE 4

17α,21-dihydroxy-4-pregnene-3,20-dione

Dissolve 1.0 g. of 17α,21-dihydroxy-4-pregnene-3,20-dione 21-carbomethoxylate in 1.0 liter of ethanol. Suspend 50 gms. of pancreatin U.S.P. in 2.5 liters of distilled water; adjust the pH to 6.0 and the temperature to 20° to 25° C. with stirring. Add the sterol solution to the enzyme suspension and stir until the hydrolysis is complete as determined by thin layer chromatography on silica gel plates. Obtain the title product by using the procedure described in Example 3.

The procedures set forth in the foregoing examples are of general applicability and may be employed to hydrolyze C–21 carbalkoxy groups from a wide variety of steroids, such as those set forth below:

9α,-fluoro-16β-methyl-1,4-pregnadiene-11β,17α,21-triol
   3,20-dione 17-acetate-21-carbopropoxylate
9α-fluoro-16β-methyl-1,4-pregnadiene-11β,17α,21-triol-
   3,20-dione 17-caproate-21-carbobutoxylate
9α-fluoro-16β-methyl-1,4-pregnadiene-11β,17α,21-triol-
   3,20-dione-17-propionate-21-carbopropoxylate
9α-fluoro-16β-methyl-1,4-pregnadiene-11β,17α,21-triol-
   3,20-dione 17-butyrate-21-carbethoxylate
9α-fluoro-16α-methyl-1,4-pregnadiene-11β,17α,21-triol-
   3,20-dione 17-acetate-21-carbobutoxylate
9α-fluoro-16α-methyl-1,4-pregnadiene-11β,17α,21-triol-
   3,20-dione 17-valerate-21-carbopropoxylate
9α-fluoro-16α-methyl-1,4-pregnadiene-11β,17α,21-triol-
   3,20-dione 17-propionate-21-carbobutoxylate
9α-fluoro-16α-methyl-1,4-pregnadiene-11β,17α,21-triol-
   3,20-dione 17-butyrate-21-carbethoxylate
9α,11β-dichloro-16α-methyl-1,4-pregnadiene-17α,21-diol-
   3,20-dione 17-valerate-21-carbethoxylate
9α-11β-dichloro-16α-methyl-1,4-pregnadiene-17α,21-
   diol-3,20-dione-17-acetate-21-carbobutoxylate 9α,11β-dichloro-16β-methyl-1,4-pregnadiene-17α,21-diol-3,20-dione 17-acetate-21-carbethoxylate
9α,11β-dichloro-16β-methyl-1,4-pregnadiene-17α,21-diol-3,20-dione 17-valerate-21-carbethoxylate
9α,11β-dichloro-16β-methyl-1,4-pregnadiene-17α,21-diol-3,20-dione 17-butyrate-21-carbopropoxylate
1,4-pregnadiene-17α,21-diol-3,11,20-trione 17-valerate-21-carbethoxylate
1,4-pregnadiene-17α,21-diol-3,11,20-trione 17-propionate-21-carbopropoxylate
1,4-pregnadiene-17α,21-diol-3,11,20-trione-17-caproate-21-carbobutoxylate
1,4-pregnadiene-11β,17α,21-triol-3,20-dione 17-valerate-21-carbethoxylate
1,4-pregnadiene-11β,17α,21-triol-3,20-dione 17-butyrate 21-carbopropoxylate
1,4-pregnadiene-11β,17α,21-triol-3,20-dione 17-acetate-21-carbobutoxylate
6α,16α-dimethyl-9α-fluoro-1,4-pregnadiene-11β,17α,21-triol-3,20-dione 17-valerate-21-carbethoxylate
6α,16α-dimethyl-9α-fluoro-1,4-pregnadiene-11β,17α,21-triol-3,20-dione 17-acetate-21-carbopropoxylate
6α,16β-dimethyl-9α-fluoro-1,4-pregnadiene-11β,17α,21-triol-3,20-dione 17-valerate-21-carbethoxylate
6α,16β-dimethyl-9α-fluoro-1,4-pregnadiene-11β,17α,21-triol-3,20-dione 17-butyrate-21-carbobutoxylate
4-pregnene-17α,21-diol-3,11,20-trione 17-propionate-21-carbobutoxylate
4-pregnene-11β,17α,21-triol-3,20-dione 17-caproate-21-carbethoxylate
9α,11β-dichloro-1,4-pregnadiene-17α,21-diol-3,20-dione 17-propionate-21-carbopropoxylate
9α-fluoro-16β-methyl-1,4-pregnadiene-11β,17α,21-triol-3,20-dione 17-benzoate-21-carbethoxylate.

When equivalent quantities of the foregoing compounds are subjected to the procedures set forth in the examples above, they will form the following products:

9α-fluoro-16β-methyl-1,4-pregnadiene-11β,17α,21-triol-3,20-dione 17-acetate
9α-fluoro-16β-methyl-1,4-pregnadiene-11β,17α,21-triol-3,20-dione 17-caproate
9α-fluoro-16β-methyl-1,4-pregnadiene-11β,17α,21-triol-3,20-dione 17-propionate
9α-fluoro-16β-methyl-1,4-pregnadiene-11β,17α,21-triol-3,20-dione 17-butyrate
9α-fluoro-16α-methyl-1,4-pregnadiene-11β,17α,21-triol-3,20-dione 17-acetate
9α-fluoro-16α-methyl-1,4-pregnadiene-11β,17α,21-triol-3,20-dione 17-valerate
9α-fluoro-16α-methyl-1,4-pregnadiene-11β,17α,21-triol-3,20-dione 17-propionate
9α-fluoro-16α-methyl-1,4-pregnadiene-11β,17α,21-triol-3,20-dione 17-butyrate
9α,11β-dichloro-16α-methyl-1,4-pregnadiene-17α,21-diol-3,20-dione 17-valerate
9α,11β-dichloro-16α-methyl-1,4-pregnadiene-17α,21-diol-3,20-dione 17-acetate
9α,11β-dichloro-16β-methyl-1,4-pregnadiene-17α,21-diol-3,20-dione 17-acetate
9α,11β-dichloro-16β-methyl-1,4-pregnadiene-17α,21-diol-3,20-dione 17-valerate
9α,11β-dichloro-16β-methyl-1,4-pregnadiene-17α,21-diol-3,20-dione 17-butyrate
1,4-pregnadiene-17α,21-diol-3,11,20-trione-17-valerate
1,4-pregnadiene-17α,21-diol-3,11,20-trione 17-propionate
1,4-pregnadiene-17α,21-diol-3,11,20-trione 17-caproate
1,4-pregnadiene-11β,17α,21-triol-3,20-dione 17-valerate
1,4-pregnadiene-11β,17α,21-triol-3,20-dione 17-butyrate
1,4-pregnadiene-11β,17α,21-triol-3,20-dione 17-acetate
6α,16α-dimethyl-9α-fluoro-1,4-pregnadiene-11β,17α,21-triol-3,20-dione 17-valerate
6α,16α-dimethyl-9α-fluoro-1,4-pregnadiene-11β,17α,21-triol-3,20-dione 17-acetate
6α,16β-dimethyl-9α-fluoro-1,4-pregnadiene-11β,17α,21-triol-3,20-dione 17-valerate
6α,16β-dimethyl-9α-fluoro-1,4-pregnadiene-11β,17α,21-triol-3,20-dione 17-butyrate
4-pregnene-17α,21-diol-3,11,20-trione 17-propionate
4-pregnene-11β,17α,21-triol-3,20-dione 17-caproate
9α,11β-dichloro-1,4-pregnadiene-17α,21-diol-3,20-dione 17-propionate
9α-fluoro-16β-methyl-1,4-pregnadiene-11β,17α,21-triol-3,20-dione 17-benzoate

We claim:

1. A process for hydrolyzing a 21-carbalkoxy steroid of the pregnane series which comprises subjecting the steroid to the hydrolytic action of pancreatin, said hydrolysis taking place in an aqueous medium having a pH of from about 6 to about 8 and at a temperature below 50° C.

2. A process according to claim 1 including the step of separating the corresponding 21-hydroxy steroid from said medium.

3. A process according to claim 1 wherein the pancreatin, steroid ratio by weight is from about 10:1 to about 100:1.

4. A process according to claim 1 wherein the hydrolysis is effected at a temperature in the range from about 5° to about 50° C.

5. A process according to claim 1 wherein the hydrolysis is effected in an aqueous medium containing a water miscible organic solvent.

6. A process according to claim 1 wherein the hydrolysis is effected in an aqueous medium containing an alcohol having 1 to 4 carbon atoms.

7. A process for selectively hydrolyzing a 21-carbalkoxy-17-alkanoyloxy corticosteroid which comprises subjecting the corticosteroid to the hydrolytic action of pancreatin, said hydrolysis taking place in an aqueous medium having a pH of from about 6 to about 8, at a temperature below 50° C. and separating the corresponding 21-hydroxy-17-alkanoyloxy corticosteroid from said medium.

8. A process according to claim 7 wherein said hydrolysis is effected in an aqueous medium containing a water miscible organic solvent.

9. A process according to claim 8 which comprises subjecting a 21-carbalkoxy-17-alkanoloxy corticosteroid to the hydrolytic action of pancreatin in an aqueous medium containing methanol, at pH 7, at about 25° C. and separating the corresponding 21-hydroxy-17-alkanoyloxy corticosteroid from said medium.

10. The process of claim 7 wherein the 21-hydroxy corticosteroid produced is 9α-fluoro-16β-methyl-11β,17α-21-triol-1,4-pregnadiene-3,20-dione 17-valerate.

11. The process of claim 7 wherein the 21-hydroxy corticosteroid produced is 9α,11β-dichloro-17α,21-dihydroxy-16α-methyl-1,4-pregnadiene-3,20-dione 17-butyrate.

12. The process of claim 7 wherein the 21-hydroxy corticosteroid produced is 9α-fluoro-16β-methyl-11β,17α,21-triol-1,4-pregnadiene-3,20-dione 17-benzoate.

References Cited
UNITED STATES PATENTS
3,094,465  6/1963  Nishikawa et al. ____ 195—51 R ALVIN E. TANENHOLTZ, Primary Examiner